US011200236B2

(12) United States Patent
Xiang et al.

(10) Patent No.: US 11,200,236 B2
(45) Date of Patent: Dec. 14, 2021

(54) SERVER-SIDE CROSS-MODEL FILTERING

(71) Applicant: BUSINESS OBJECTS SOFTWARE LTD., Dublin (IE)

(72) Inventors: Ping Xiang, Richmond (CA); Semuel Kadarusman, Burnaby (CA); Patrick Wang, Richmond (CA); Justin Wong, Burnaby (CA); Veljko Jovanovic, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 80 days.

(21) Appl. No.: 16/563,200

(22) Filed: Sep. 6, 2019

(65) Prior Publication Data

US 2021/0073230 A1 Mar. 11, 2021

(51) Int. Cl.

| | |
|---|---|
| ***G06F 3/048*** | (2013.01) |
| ***G06F 16/2453*** | (2019.01) |
| ***G06F 16/248*** | (2019.01) |
| ***G06F 16/2455*** | (2019.01) |
| ***G06F 16/22*** | (2019.01) |
| ***G06F 16/21*** | (2019.01) |

(52) U.S. Cl.

CPC ...... *G06F 16/24544* (2019.01); *G06F 16/212* (2019.01); *G06F 16/2264* (2019.01); *G06F 16/248* (2019.01); *G06F 16/2456* (2019.01)

(58) Field of Classification Search

None

See application file for complete search history.

(56) References Cited

U.S. PATENT DOCUMENTS

2013/0238549 A1* 9/2013 Aski .................... G06F 16/283 707/602

OTHER PUBLICATIONS

Venugopal, Niveditha, Annotation-Enabled Interpretation and Analysis of Time-Series Data, Nov. 7, 2018, Portland State University PDXScholar (Year: 2018).*

* cited by examiner

*Primary Examiner* — William C Trapanese

(74) *Attorney, Agent, or Firm* — Buckley, Maschoff & Talwalkar LLC

(57) ABSTRACT

A system includes reception of a filter on a first dimension of a first data model, determination of an association between a second dimension of the first data model and a first dimension of a second data model, generation of a calculated dimension based on the second dimension, the rows of the calculated dimension being identical to the rows of the first dimension, application of the filter to the rows of the calculated dimension to generate filtered rows of the calculated dimension, execution of an inner join between the filtered rows of the calculated dimension and a fact table of the second data model to generate a result table including one or more measure values of the second data model, and generation of a visualization including the result table.

18 Claims, 15 Drawing Sheets

200

| Region | Company_ID | Product | Sales_Quantity |
|---|---|---|---|
| region_A | 1 | XY | 3 |
| region_A | 2 | YZ | 10 |
| region_B | 3 | XY | 2 |
| region_A | 6 | XY | 10 |
| region_C | 10 | XY | 1 |

500

530

| Product | Sales_Quantity |
|---|---|
| XY | 16 |

Data Source
Sales
Chart Type
MEASURES
Sales_Quantity
+ Add Measure
DIMENSIONS
Product
+ Add Dimension
FILTERS
Product = "XY"
+ Add Filter 520
510

200

| Region | Company_ID | Product | Sales_Quantity |
|---|---|---|---|
| region_A | 1 | XY | 3 |
| region_A | 2 | YZ | 10 |
| region_B | 3 | XY | 2 |
| region_A | 6 | XY | 10 |
| region_C | 10 | XY | 1 |

250

| Region | Company_ID | Company_Name | Revenue |
|---|---|---|---|
| region_A | 1 | CN1 | 3.5M |
| region_B | 3 | CN3 | 20M |
| region_C | 10 | CN10 | 11M |
| region_A | 6 | CN6 | 5M |
| region_A | 2 | CN2 | 17M |

| Region | Company_ID | Product | Sales_Quantity |
|---|---|---|---|
| region_A | 1 | XY | 3 |
| region_A | 2 | YZ | 10 |
| region_B | 3 | XY | 2 |
| region_A | 6 | XY | 10 |
| region_C | 10 | XY | 1 |

800

| Region | Company_ID | CD1_Region | CD1_Company _ID |
|---|---|---|---|
| region_A | 1 | region_A | 1 |
| region_A | 2 | region_A | 2 |
| region_B | 3 | region_B | 3 |
| region_A | 6 | region_A | 6 |
| region_C | 10 | region_C | 10 |

| Region | Company_ID | CD1_Region | CD1_Company _ID |
|---|---|---|---|
| region_A | 1 | region_A | 1 |
| region_B | 3 | region_B | 3 |
| region_A | 6 | region_A | 6 |
| region_C | 10 | region_C | 10 |

| CD1_Region | CD1_Company _ID |
|---|---|
| region_A | 1 |
| region_B | 3 |
| region_A | 6 |
| region_C | 10 |

⋈

250

| Region | Company_ID | Company Name | Revenue |
|---|---|---|---|
| region_A | 1 | CN1 | 3.5M |
| region_B | 3 | CN3 | 20M |
| region_C | 10 | CN10 | 11M |
| region_A | 6 | CN6 | 5M |
| region_A | 2 | CN2 | 17M |

FIG. 9

| Region | Company_ID | Revenue |
|---|---|---|
| region_A | 1 | 3.5M |
| region_B | 3 | 20M |
| region_C | 10 | 11M |
| region_A | 6 | 5M |

| Color_1 | Export_Rate_1 | Sample Size |
|---|---|---|
| Green | Low | 352,000 |
| Green | High | 3,000 |
| Blue | Low | 36,000 |
| Blue | Moderate | 141,000 |
| Red | Low | 88,000 |
| Red | Moderate | 133,300 |
| Red | High | 12,000 |

| Color_2 | Net Income |
|---|---|
| Green | -194,001 |
| Blue | 83,000 |
| Red | -127,299 |
| Orange | 62,000 |
| Yellow | -59,000 |

1200

| Color_1 | Export_Rate_1 | Sample Size |
|---|---|---|
| ~~Green~~ | ~~Low~~ | 352,000 |
| ~~Green~~ | ~~High~~ | 3,000 |
| ~~Blue~~ | ~~Low~~ | 36,000 |
| Blue | Moderate | 141,000 |
| ~~Red~~ | ~~Low~~ | 88,000 |
| Red | Moderate | 133,300 |
| ~~Red~~ | ~~High~~ | 12,000 |

1300

| Color_1 | CD_Color_1 | Sample Size |
|---|---|---|
| Green | Green | 355,000 |
| Blue | Blue | 36,000 |
| Red | Red | 100,000 |

| Color_1 | Export_Rate_1 | Sample Size |
|---|---|---|
| ~~Green~~ | ~~Low~~ | 352,000 |
| ~~Green~~ | ~~High~~ | 3,000 |
| ~~Blue~~ | ~~Low~~ | 36,000 |
| Blue | Moderate | 141,000 |
| ~~Red~~ | ~~Low~~ | 88,000 |
| Red | Moderate | 133,300 |
| ~~Red~~ | ~~High~~ | 12,000 |

1400

| Color_1 | CD2_Color_1 | Sample Size |
|---|---|---|
| Blue | Blue | 141,000 |
| Red | Red | 133,300 |

| Color_1 | CD_Color_1 |
|---|---|
| Green | Green |
| Blue | Blue |
| Red | Red |

1400

| Color_1 | CD2_Color_1 |
|---|---|
| Blue | Blue |
| Red | Red |

1250

| Color_2 | Net Income |
|---|---|
| Green | -194,001 |
| Blue | 83,000 |
| Red | -127,299 |
| Orange | 62,000 |
| Yellow | -59,000 |

1500

| Color_2 | CD1_Color_1 | CD1_Color_2 | Net Income |
|---|---|---|---|
| Green | Green | NULL | -194,001 |
| Blue | Blue | Blue | 83,000 |
| Red | Red | Red | -127,299 |
| Orange | NULL | NULL | 62,000 |
| Yellow | NULL | NULL | -59,000 |

| Color_2 | CD1_Color_1 | CD1_Color_2 | Net Income |
|---|---|---|---|
| Blue | Blue | Blue | 83,000 |
| Red | Red | Red | -127,299 |
| Orange | NULL | NULL | 62,000 |
| Yellow | NULL | NULL | -59,000 |

*FIG. 16*

SERVER-SIDE CROSS-MODEL FILTERING

BACKGROUND

Modern computing systems receive, generate, and store data related to many aspects of an enterprise. Users operate reporting tools to access such data and display the data in useful formats, such as in graphic visualizations. Specifically, a reporting tool may submit a query to a data storage system and present a visualization of a corresponding result set.

The query may specify, dimensions, measures and/or filters of a data model, or schema, which characterizes the stored data. In some instances, a user may wish to query a second data model using a filter on a dimension of a first data model. This filtering across models may become necessary if it is discovered that linking two data models constructed for different purposes might yield additional insights, but merging the two data models to create one big model would be expensive.

If the first and second data models not logically linked, execution of such a query requires specification of an association, or link, between at least one dimension of each of the data models. Execution further requires fetching of tuples of the linked dimension(s) of the first data model which satisfy the filter, and then querying the second data model based on each fetched tuple.

The foregoing process can consume substantial client processing resources and network bandwidth. Systems are desired to efficiently support filtering across data models.

BRIEF DESCRIPTION OF THE DRAWINGS

FIG. 2 shows tabular representations of a source table conforming to a first data model and a target table conforming to a second data model according to some embodiments

FIGS. 8A and 8B are tabular representations of intermediate tables including calculated dimensions according to some embodiments.

FIG. 9 illustrates an inner join between the calculated dimensions of FIG. 8B and the target table of FIG. 2.

FIG. 13 shows tabular representations of the FIG. 12 source table and an intermediate table including a calculated dimension according to some embodiments.

FIG. 14 shows tabular representations of the FIG. 12 source table and a second intermediate table including a calculated dimension according to some embodiments.

FIG. 15 illustrates a left outer join between the calculated dimensions of FIGS. 13 and 14 and the target table of FIG. 12.

FIG. 16 illustrates a result set according to the FIG. 11 process.

DETAILED DESCRIPTION

The following description is provided to enable any person in the art to make and use the described embodiments. Various modifications, however, will remain readily apparent to those in the art.

Generally, some embodiments provide execution of a query on a target data model which is filtered on a dimension of a source data model, even if the source data model and the target data model are not logically linked. Some embodiments provide for the majority of query execution to occur on the backend, thereby freeing client resources in comparison to prior approaches.

Figure 1:
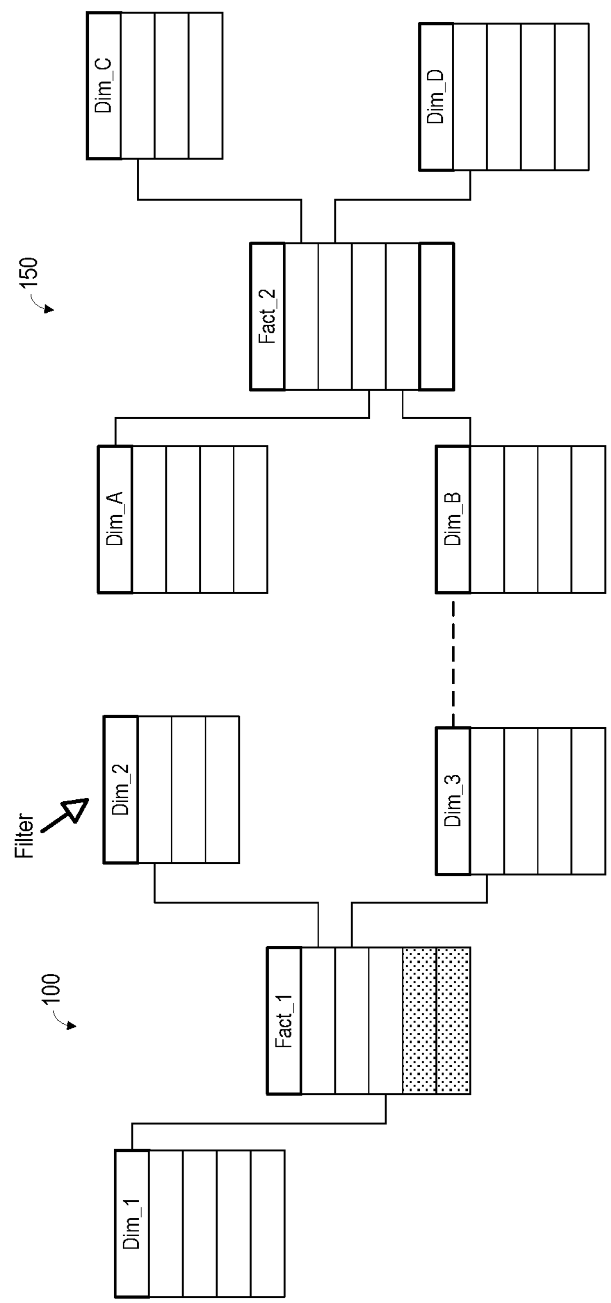
FIG. 1 is a view of two data models and a logical link between dimensions of the two data models according to some embodiments.

According to some embodiments, an association is established between a first dimension of the source data model and a second dimension of the target data model, and the above-described query filter is on another dimension of the source data model. FIG. 1 illustrates an example of the foregoing scenario according to some embodiments.

FIG. 1 includes data model 100 consisting of fact table Fact_1 and dimension tables Dim_1, Dim_2, and Dim_3. Fact table Fact_1 includes foreign keys to each of dimension tables Dim_1, Dim_2, and Dim_3 and two measures (shaded). Dimensions are logical entities along which an analysis or report may be executed (e.g., Year, Country, Product), and measures (e.g., Sales, Profit) are values which can be determined for a given combination of dimension values, or dimension members (e.g., Sales for 2006, U.S.A., Televisions).

Data model 150 includes fact table Fact_2 and dimension tables Dim_A, Dim_B, Dim_C, and Dim_D. Although fact tables Fact_1 and Fact_2 are associated with three and four dimensions, respectively, embodiments may support models including any number of dimensions. Embodiments may also support data models conforming to schema topologies different from the star schemas depicted in FIG. 1.

The schemas of data models 100 and 150 do not define any logical relationship between data models 100 and 150. FIG. 1 includes a dashed line to depict a link between dimension Dim_3 of data model 100 and dimension Dim_B of data model 150. Some embodiments may support linking of two or more dimensions of a first data model to a second data model. As will be described below, the link(s) may be user-specified in order to support a query on a measure of fact table Fact_2 of data model 150 which is filtered on a non-linked dimension (e.g., dimension Dim_2) of data model 100.

FIG. 2 shows a tabular representation of source table 200 which conforms to a first data model, and target table 250 which conforms to a second data model. It will be assumed that the schemas of each data model do not define a logical relationship therebetween. Nevertheless, as illustrated by dashed lines, links or associations have been determined (e.g., via user input) between the Region dimension of the first data model and the Region dimension of the second data model, and between the Company_ID dimension of the first data model and the Company_ID dimension of the second data model. Although the linked dimensions are similarly-named, embodiments are not limited thereto. The tables of FIG. 2 will be used below to provide an example of execution of a query on a target data model which is filtered on a non-linked dimension of a source data model.

Figure 3:
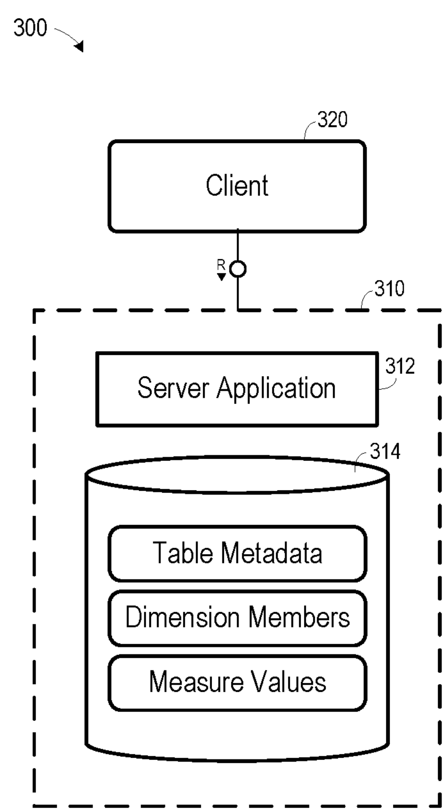
FIG. 3 is a block diagram of a system architecture according to some embodiments.

FIG. 3 is a block diagram of system architecture 300 according to some embodiments. Embodiments are not limited to system architecture 300 or to a database architecture.

Architecture 300 includes data server 310 and client 320. Generally, data server 310 receives requests from client 320 and provides results to client 320 based on those requests. Server application 312 may be separated from or closely integrated with data store 314. Server application 312 may be executed completely on the database platform of data store 314, without the need for an additional server. Architecture 300 may be implemented using any client-server architecture that is or becomes known, including but not limited to on-premise, cloud-based and hybrid architectures.

In one specific example, client 320 executes an application to present a user interface to a user. The user defines a query using the user interface, and client 320 forwards a request based on the query to server 310. Server application 312 generates an SQL script based on the request and forwards the SQL script to data store 314. Data store 314 executes the SQL script to return a result set based on data of data store 314, and client 320 generates and displays a report/visualization based on the result set.

Data store 314 stores table metadata, dimension members, and measure values. Generally, the table metadata defines two or more data models, each of which includes data objects such as dimension and measures. The stored dimension members and measure values comprise data representing actual (i.e., instantiated) versions of those objects. The table metadata also associates each measure and dimension with one or more physical entities (e.g., a physical database table, associated columns of one or more database tables).

The data of data store 314 may comprise one or more of conventional tabular data, row-based data, column-based data, and object-based data. Moreover, the data may be indexed and/or selectively replicated in an index to allow fast searching and retrieval thereof. Data store 314 may support multi-tenancy to separately support multiple unrelated clients by providing multiple logical database systems which are programmatically isolated from one another.

Data store 314 may comprise any query-responsive data source or sources that are or become known, including but not limited to a structured-query language (SQL) relational database management system. Data store 314 may comprise a relational database, a multi-dimensional database, an eXtendable Markup Language (XML) document, or any other data storage system storing structured and/or unstructured data. The data of data store 314 may be distributed among several relational databases, dimensional databases, and/or other data sources. Embodiments are not limited to any number or types of data sources.

Data store 314 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 320 may comprise one or more devices executing program code of an application for presenting user interfaces to allow interaction with server 310. The user interfaces may be suited for reporting, data analysis, and/or any other functions based on the data of data store 314.

Figure 4:
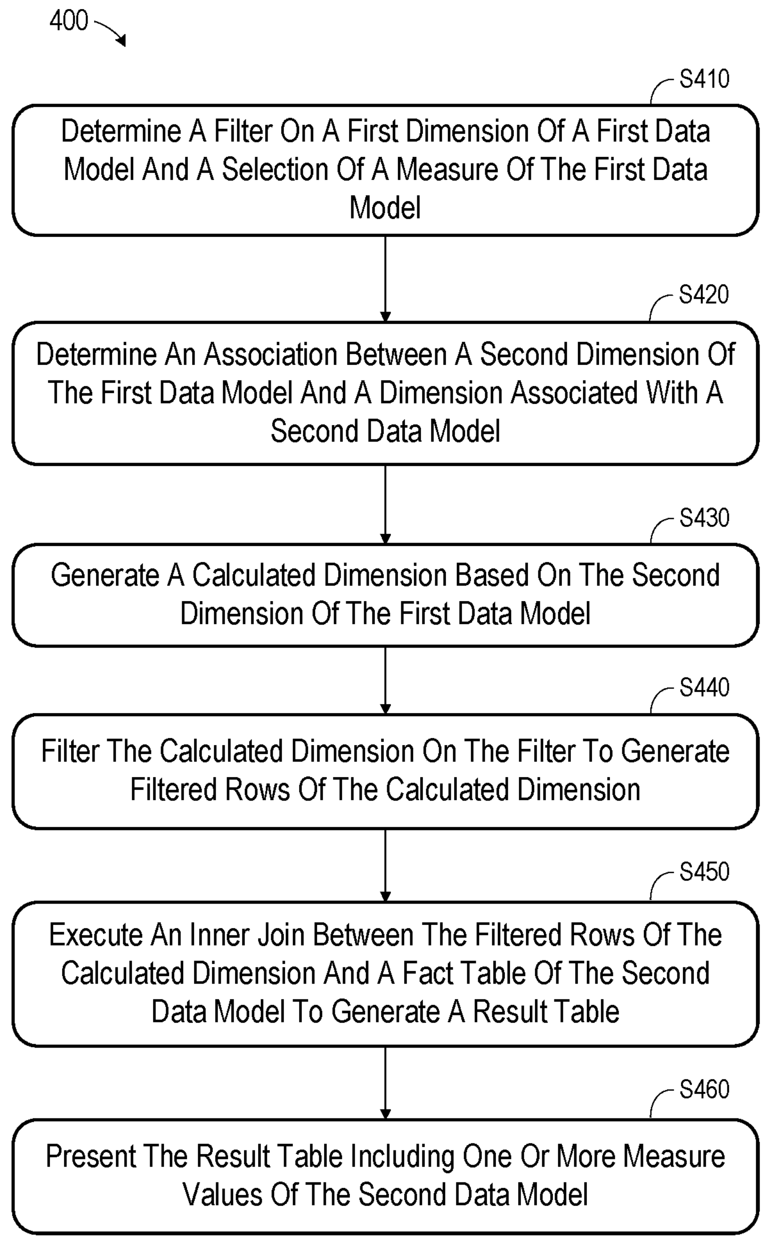
FIG. 4 is a flow diagram of a process to execute a query on a second data model based on a filter on a dimension of a first data model according to some embodiments.

FIG. 4 comprises a flow diagram of process 400 according to some embodiments. Process 400 may be executed to execute a query on a second data model which is filtered on a non-linked dimension of a first data model.

In some embodiments, various hardware elements of system 300 execute program code to perform process 400. Process 400 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 5:
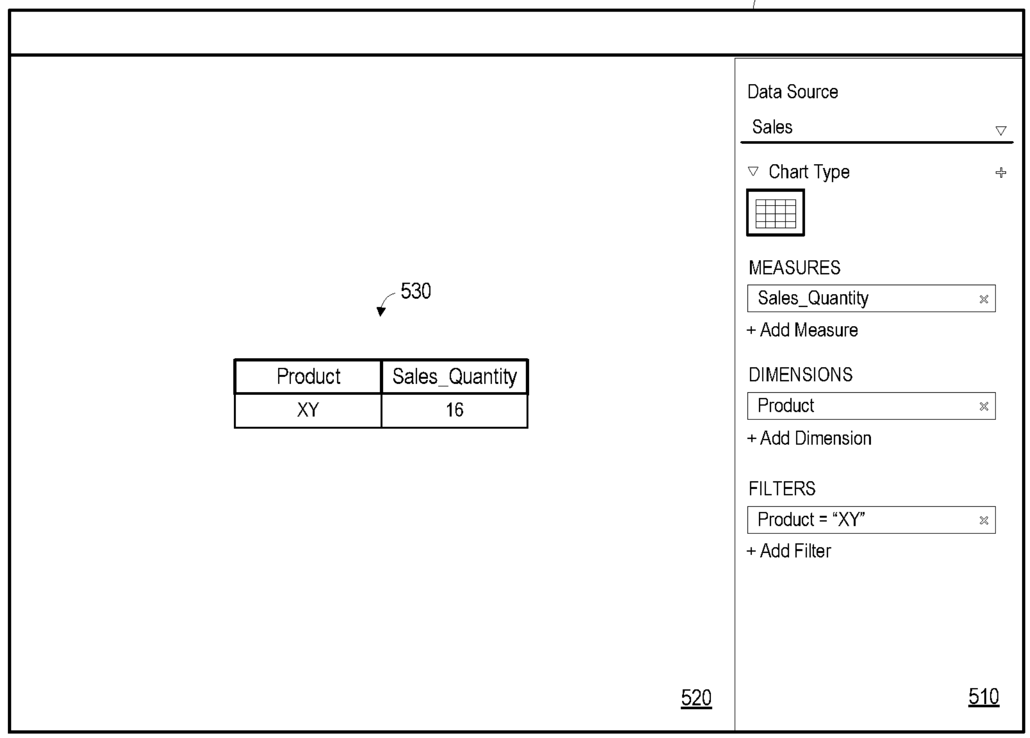
FIG. 5 is a view of a user interface to select data visualization metadata and to display a data visualization according to some embodiments.
Figure 6:
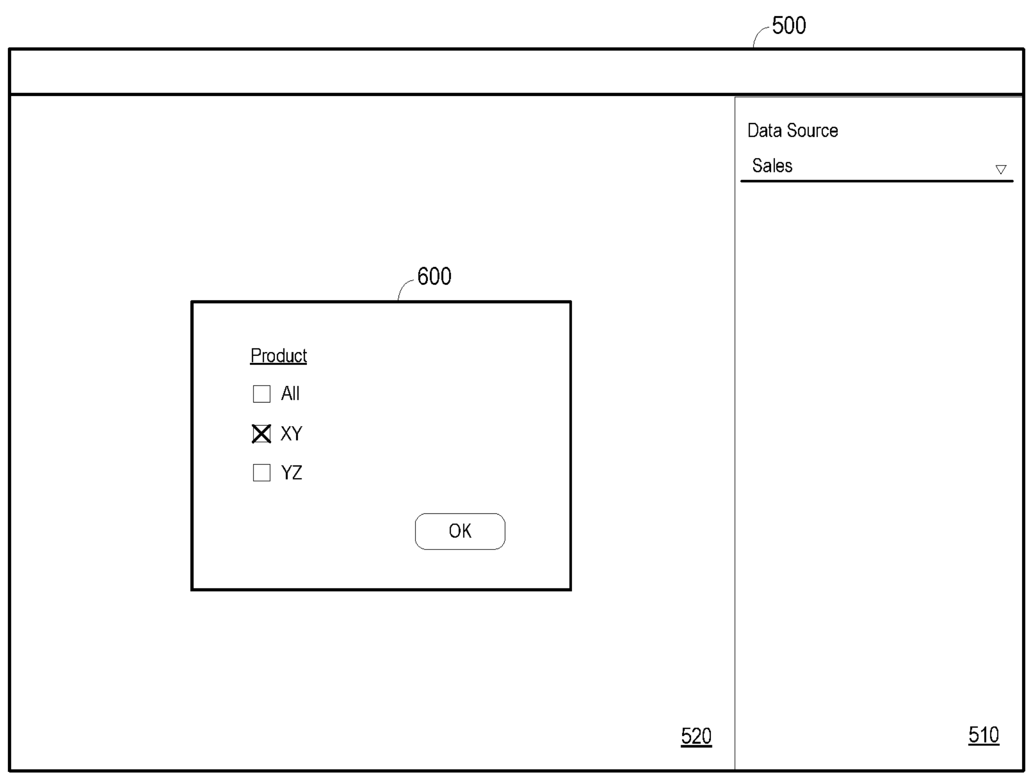
FIG. 6 is a view of a user interface to select a story dimension filter according to some embodiments.

Initially, at S410, a filter on a first dimension of a first data model is determined. Also determined at S410 is a measure context including at least one measure of the first data model. The first data model may comprise a source data model as described above. FIGS. 5 and 6 illustrate determinations of a dimension filter according to some embodiments.

FIG. 5 illustrates interface 500 for receiving such user input according to some embodiments. Interface 500 of FIG. 5 may comprise a Web page displayed by a Web browser application executing on a client device. Embodiments are not limited to interface 500. The Web page may be provided by a cloud-based or on-premise Web server. Interface 500 is not limited to Web-based formats. User interface 500 may be rendered on server 310 or may be transmitted to client 320 as XML, HTML and JavaScript for rendering thereon.

Interface 500 includes query definition area 510 to receive elements of a query from a user. Area 510 includes fields which allow a user to specify a data source to which the query will be applied, a chart type (e.g., pie, line, bar, etc.), one or more measures, zero or more dimensions, and zero or more filters.

As shown in interface 500, the user has selected a Sales data source, which in the present example is represented by table 200 of FIG. 2. Table 200 is reproduced in FIG. 5 for convenience. The user has also manipulated the input fields of area 510 to specify a table chart, the measure Sales_Quantity, the dimension Product, and the filter "='XY'" on the Product dimension. Area 520 of interface 500 illustrates visualization 530 resulting from a query defined by the chart, measure, dimension and filter specified in area 510.

In the FIG. 5 example, the filter Product='XY' is determined at S410 and is specific to visualization 530. Also determined at S410 is a measure context including all measures used in visualization 530 (i.e., Sales_Quantity).

In some embodiments, the dimension filter (and the measure context) determined at S410 is not associated with any particular visualization. Such a filter may be considered a "group-level" filter which applies to all visualizations in a particular user-defined group of visualizations. If such a group is not specified, such a filter is applied to all visualization in the current story. FIG. 6 illustrates window 600 of interface 500. As shown, a user has manipulated window 600 to define the group-level dimension filter Product='XY'. In the case of FIG. 6, the corresponding measure context consists of all measures of the first data model which includes the Product dimension.

An association is determined between a second dimension of the first data model and a dimension of a second data model at S420. The second dimension of the first data model is different from the first dimension (e.g., Product) associated with the filter determined at S410. As described with respect to FIG. 2, more than one association may be determined at S420. The association may be determined based on user input which indicates that two dimensions include similar dimension members because, for example, the dimensions represent a same semantic.

Figure 7:
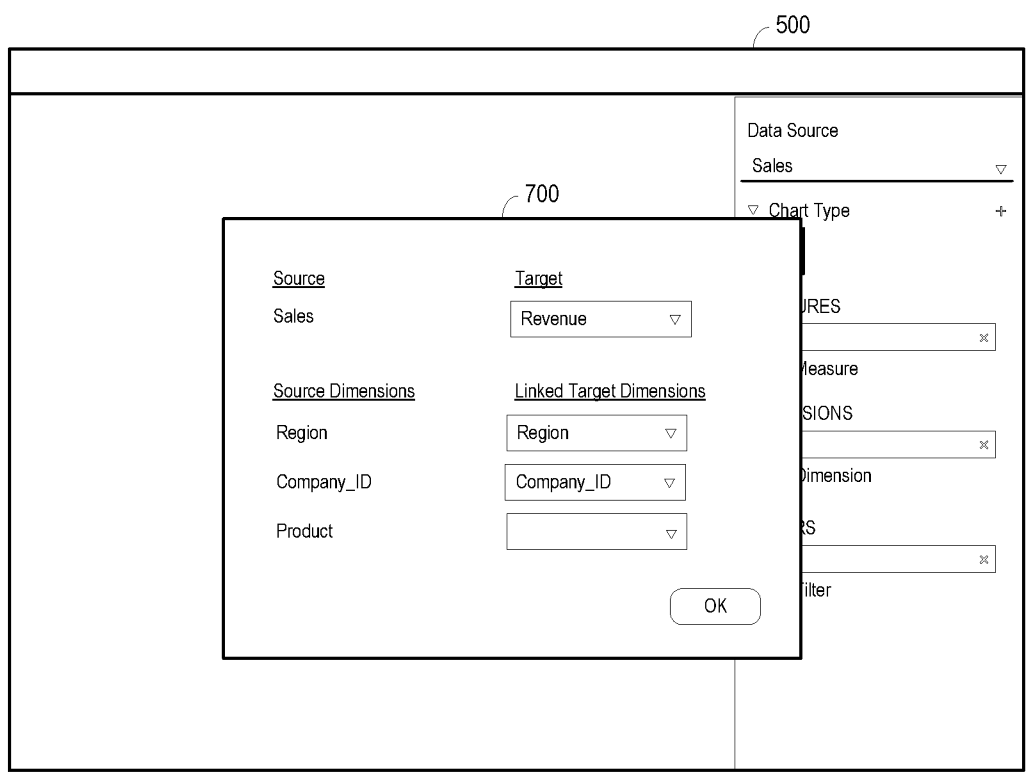
FIG. 7 is a view of a user interface to define links between dimensions of two data models according to some embodiments.

Continuing the present example, FIG. 7 illustrates user operation of interface 500 to invoke window 700 for specifying linked dimensions. Window 700 may list any dimension of the source (i.e., first) data model. Window 700 also allows selection of the second, or target, data model. The user has selected a Revenue data source as the second data model, which in the present example is represented by table 250 of FIG. 2. By virtue of selection of the Revenue data source, the user is able to specify dimensions of the Revenue data source to link with one or more dimensions of the Sales data source. As shown, the user has manipulated drop-down boxes to indicate a link, or association, between the Region dimension of the Sales data source and the Region dimension of the Revenue data source, and between the Company_ID dimension of the Sales data source and the Company_ID dimension of the Revenue data source.

In response to the association of the dimensions, and based on the filter determined at S410, a calculated dimension is generated at S430 based on the second dimension of the first data model.

FIG. 8A illustrates generated calculated dimensions 800 according to some embodiments. Because both of dimensions Region and Company_ID of the source data model are linked to dimensions of the target data model, calculated dimensions are generated based on both dimensions at S430. As shown, the rows of calculated dimension CD1_Region are identical to the rows of dimension Region and the rows of calculated dimension CD1_Company_ID are identical to the rows of dimension Company_ID.

At S440, the calculated dimension is filtered on the specified filter while considering the measure context of the first data model to generate filtered rows of the calculated dimension. Since the second row of calculated dimensions 800 is associated with Product=YZ (see table 200), this row is filtered out at S440 as shown in FIG. 8B. The filtered calculated dimension may be generated at server 310 in response to a pre-query transmitted from client 320, and stored at server 310 as an intermediate result.

Figure 10:
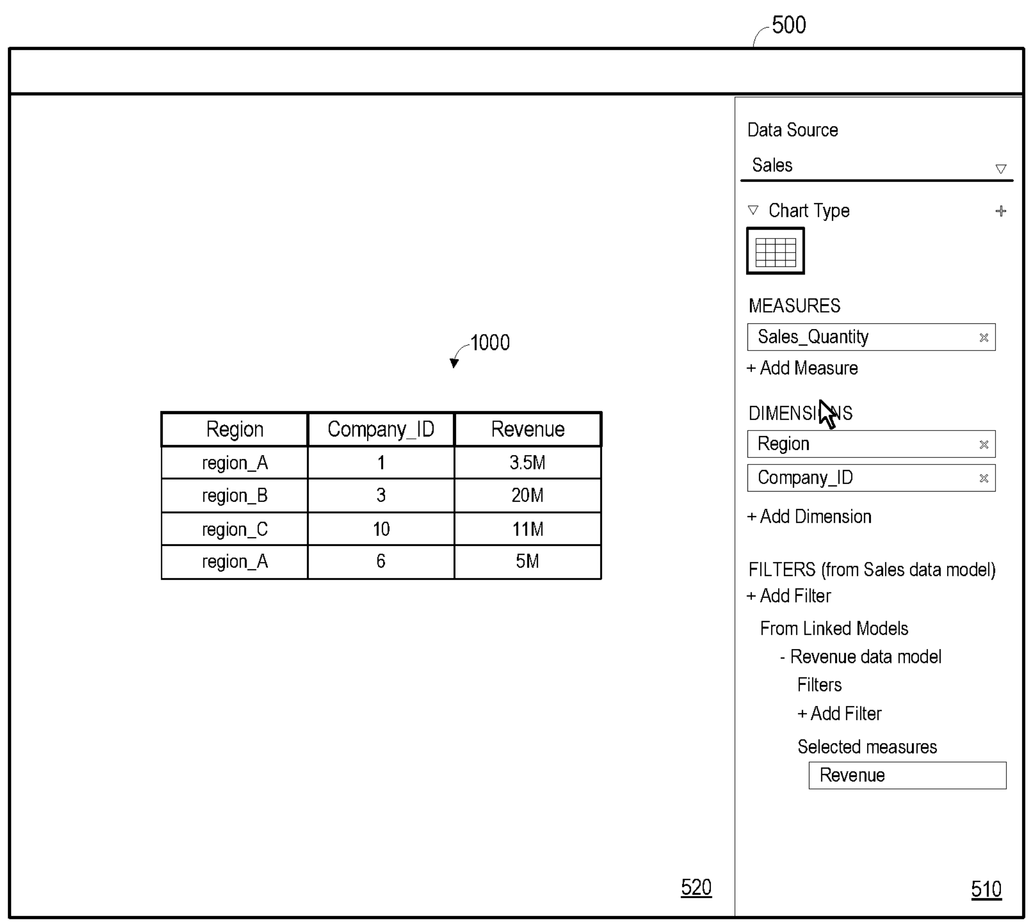
FIG. 10 is a view of a user interface showing a measure value of a target table filtered on an unlinked dimension of a source table according to some embodiments.

An inner join is then executed on the filtered rows of the calculated dimension and the fact table of the second data model to generate a result table at S450. FIG. 9 depicts the inner join at S450 according to the present example. As is known in the art, the result of an inner join includes only those tuples that satisfy the matching criteria, and excludes other tuples. Accordingly, the result set includes only those tuples of table 250 which include a tuple of the calculated dimensions 800 (i.e., [region_A, 1], [region_B, 3], [region_A, 6], or [region_C, 10]). The result set 1000 including the measure of the second data model is then presented at S460, for example as depicted in FIG. 10.

Figure 11:
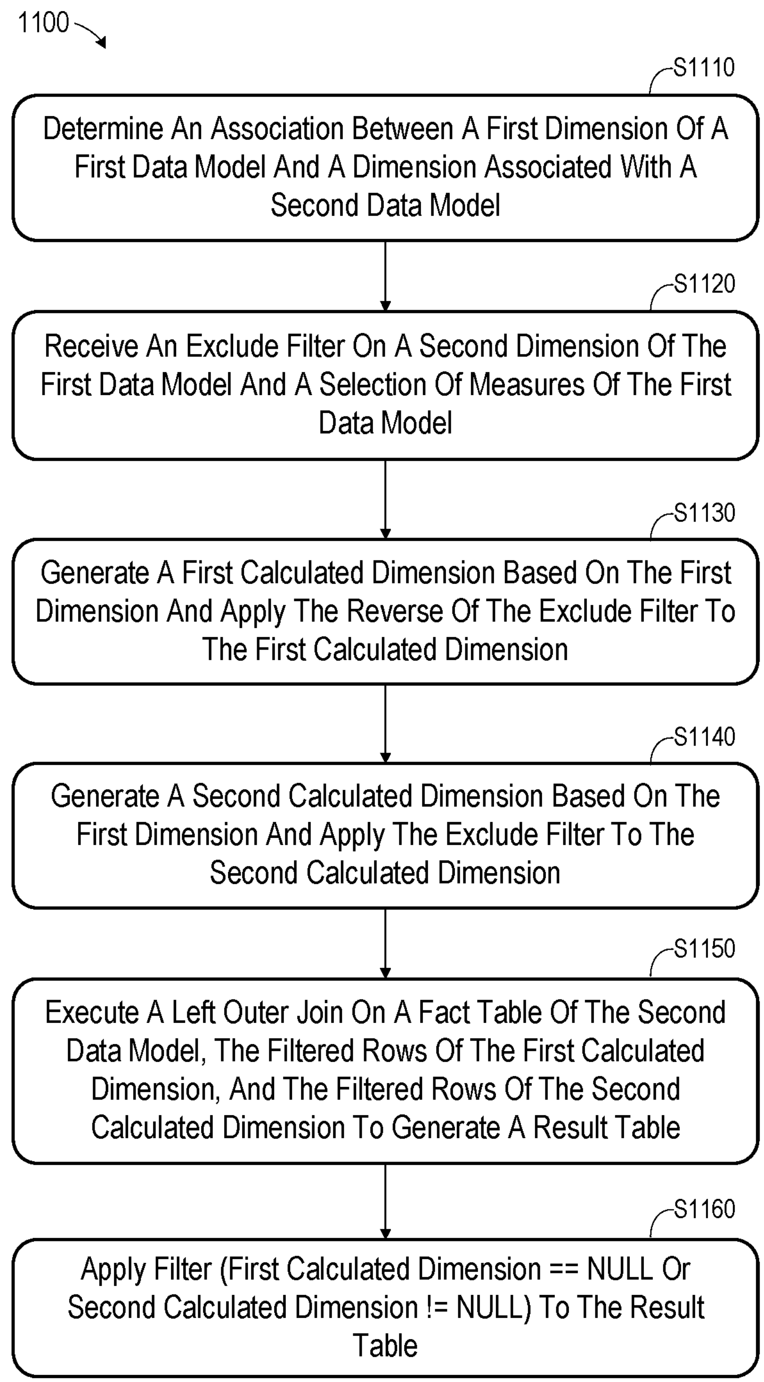
FIG. 11 is a flow diagram of a process to execute a query on a second data model based on an exclude filter on a dimension of a first data model according to some embodiments.

FIG. 11 comprises a flow diagram of process 1100 to execute a query on a second data model which includes an exclude filter on a non-linked dimension of a first data model.

At S1110, an association is determined between a first dimension of a first data model and a dimension of a second data model. Such an association may be determined as described above with respect to S420 or in any other suitable manner.

Figure 12:
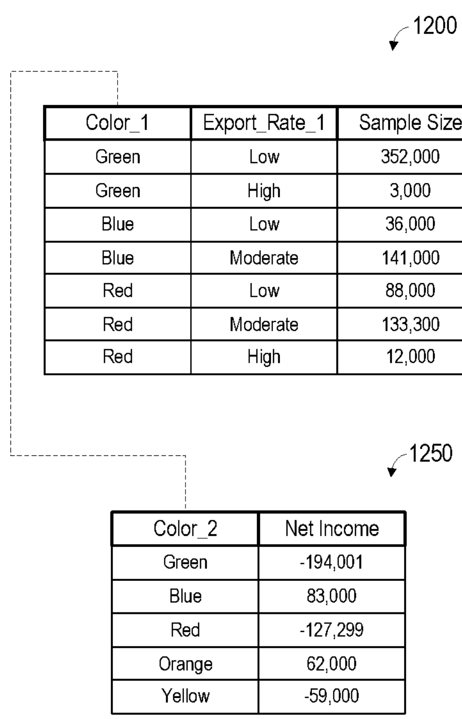
FIG. 12 shows tabular representations of a source table conforming to a first data model and a target table conforming to a second data model according to some embodiments.

For purposes of describing an example of process 1100, FIG. 12 shows a tabular representation of source table 1200 which conforms to a first data model, and target table 1250 which conforms to a second data model. An association has been established between the Color_1 dimension of the first data model and the Color_2 dimension of the second data model.

Next, at S1120, an exclude filter on a second dimension of the first data model and a selection of one or more measures of the first data model are received. With respect to the FIG. 12 tables, the exclude filter may exclude "Low" and "High" values of the Export_Rate_1 dimension of the first data model and the selected measure may be the Sample Size measure of the first data model. As in the previous example, the filtered Export_Rate_1 dimension of the first data model is not linked to any dimension of the second data model and the selected measure is determined by the current measure context.

A filtered first calculated dimension is generated at S1130. Specifically, a first calculated dimension is generated based on the first dimension of the first data model, and on the reverse of the exclude filter. Table 1200 of FIG. 13 illustrates the rows which are excluded by the above-mentioned exclude filter. Since the reverse of the exclude filter is applied to the rows of the first calculated dimension at S1130, the crossed-out rows of the Color_1 dimension of table 1200 are used to generate filtered first calculated dimension CD_Color_1 of intermediate table 1300. As shown, duplicate row values are aggregated as are their associated measure values. The filtered first calculated dimension may be generated at server 310 at S1130 in response to a pre-query transmitted from client 320, and stored at server 310 as an intermediate result.

A filtered second calculated dimension is generated at S1140. In the case of S1140, a second calculated dimension is generated based on the first dimension of the first data model, and on the exclude filter. Table 1200 of FIG. 14 again illustrates the rows which are excluded by the current exclude filter. At S1140, the non-crossed-out rows of the Color_1 dimension of table 1200 are used to generate filtered second calculated dimension CD_Color_2 of intermediate table 1400. The filtered second calculated dimension may be generated at server 310 in response to a second pre-query transmitted from client 320, and stored at server 310 as a second intermediate result.

Next, at S1150, a left outer join is executed on the filtered first calculated dimension, the filtered second calculated dimension and the fact table of the second data model to generate a result table at S1150. The left outer join operation maintains all tuples in the left relation. However, if no matching tuple is found in the right relation, the attributes of the right relation in the join result are filled with NULL values. FIG. 15 depicts result table 1500 resulting from the left outer join of tables 1300, 1400 and 1250 at S1150.

Finally, at S1160, a filter is applied to the result table. The filter may comprise: First calculated dimension==NULL or second calculated dimension !=NULL. FIG. 16 illustrates table 1600 resulting from application of the filter to table 1500. Table 1600 therefore provides values of the Net Income measure of the second data model based on an exclude filter applied to a non-linked dimension (i.e., Export_Rate_1) of the first data model.

Figure 17:
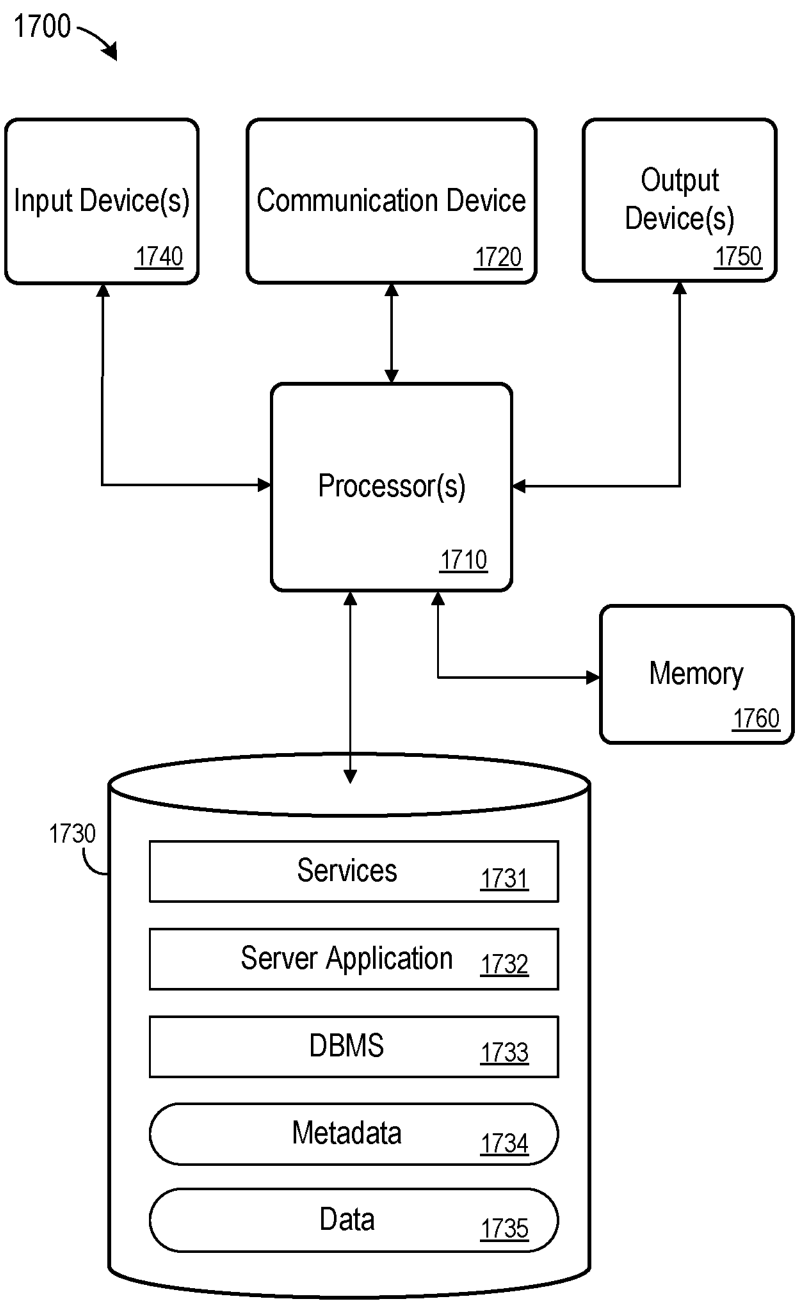
FIG. 17 is a block diagram of an apparatus according to some embodiments.

FIG. 17 is a block diagram of apparatus 1700 according to some embodiments. Apparatus 1700 may comprise a general-purpose computing apparatus and may execute program code to perform any of the functions described herein. Apparatus 1700 may comprise an implementation of server 310 of FIG. 3 in some embodiments. Apparatus 1700 may include other unshown elements according to some embodiments.

Apparatus 1700 includes processor(s) 1710 operatively coupled to communication device 1720, data storage device 1730, one or more input devices 1740, one or more output devices 1750 and memory 1760. Communication device 1720 may facilitate communication with external devices, such as a reporting client, or a data storage device. Input device(s) 1740 may comprise, for example, a keyboard, a keypad, a mouse or other pointing device, a microphone, knob or a switch, an infra-red (IR) port, a docking station, and/or a touch screen. Input device(s) 1740 may be used, for example, to enter information into apparatus 1700. Output device(s) 1750 may comprise, for example, a display (e.g., a display screen), a speaker, and/or a printer.

Data storage device 1730 may comprise any appropriate persistent storage device, including combinations of magnetic storage devices (e.g., magnetic tape, hard disk drives and flash memory), optical storage devices, Read Only Memory (ROM) devices, etc., while memory 1760 may comprise Random Access Memory (RAM), Storage Class Memory (SCM) or any other fast-access memory.

Services 1731, server application 1732 and DBMS 1733 may comprise program code executed by processor 1710 to cause apparatus 1700 to perform any one or more of the processes described herein. Embodiments are not limited to execution of these processes by a single apparatus.

Metadata 1734 and data 1735 (either cached or a full database) may be stored in volatile memory such as memory 1760. Metadata 1734 may include information regarding dimensions and measures associated with the data models represented within data 1734. Data storage device 1730 may also store data and other program code for providing additional functionality and/or which are necessary for operation of apparatus 1700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a client system comprising:

a memory storing processor-executable program code; and a processing unit to execute the program code to cause the client system to:

determine a filter on a first dimension of a first data model, wherein a second dimension of the first data model is associated with a first dimension of a second data model and the first dimension of the first data model is a non-linked dimension to the second data model; and a server system comprising:

a memory storing processor-executable program code; and a processing unit to execute the program code to cause the server system to:

generate a calculated dimension based on the determined filter and the second dimension of the first data model;

apply the filter to the calculated dimension generate filtered rows;

execute an inner join on the filtered rows of the calculated dimension and a fact table of the second data model to generate a result table including one or more measure values of the second data model; and generate a visualization including the result table, wherein the user device is to display the visualization.

2. A system according to claim 1, a client system to receive an indication of the association of the second dimension of the first data model with the first dimension of the second data model.

3. A system according to claim 1, wherein a third dimension of the first data model is associated with a third dimension of the second data model.

4. A system according to claim 1, wherein the first dimension of the first data model is not associated with any dimension of the second data model.

5. A system according to claim 1, the client system to transmit a pre-query to the server system to request generation of the calculated dimension based on the second dimension and filtering of the calculated dimension to generate the filtered rows of the calculated dimension.

6. A system according to claim 5, the server system to store the filtered rows of the calculated dimension as an intermediate table.

7. A computer-implemented method comprising:

receiving a filter on a first dimension of a first data model;

determining an association between a second dimension of the first data model and a first dimension of a second data model, wherein the first dimension of the first data model is a non-linked dimension to the second data model;

generating a calculated dimension based on the determined filter and the second dimension, the rows of the calculated dimension being identical to the rows of the second dimension;

applying the filter to the rows of the calculated dimension to generate filtered rows of the calculated dimension;

executing an inner join on the filtered rows of the calculated dimension and a fact table of the second data model generate a result table including one or more measure values of the second data model; and generating a visualization including the result table.

8. A method according to claim 6, further comprising receiving an indication of the association of the second dimension of the first data model with the first dimension of the second data model from a client system.

9. A method according to claim 6, wherein a third dimension of the first data model is associated with a third dimension of the second data model.

10. A method according to claim 6, wherein the first dimension of the first data model is not associated with any dimension of the second data model.

11. A method according to claim 6, further comprising receiving a pre-query to request generation of the calculated dimension based on the second dimension and filtering of the rows of the calculated dimension to generate the filtered rows of the calculated dimension.

12. A method according to claim 11, further comprising storing the filtered rows of the calculated dimension as an intermediate table.

13. A server system comprising:

a memory storing processor-executable program code; and a processing unit to execute the program code to cause the system to:

receive an exclude filter on a first dimension of a first data model;

determine an association between a second dimension of the first data model and a first dimension of a second data model, the first dimension of first data model being a non-linked dimension to the second data model;

generate a first calculated dimension based on the second dimension of the first data model;

apply a reverse of the exclude filter to rows of the first calculated dimension;

generate a second calculated dimension based on the second dimension of the first data model;

apply the exclude filter to rows of the second calculated dimension;

execute a left outer join on a fact table of the second data model, the filtered rows of the first calculated dimension, and the filtered rows of the second calculated dimension to generate a result table including one or more measure values of the second data model; and generate a visualization including the result table.

14. A system according to claim 13, further to receive an indication of the association of the second dimension of the first data model with the first dimension of the second data model from a user.

15. A system according to claim 13, wherein a third dimension of the first data model is associated with a third dimension of the second data model.

16. A system according to claim 13, wherein the first dimension of the first data model is not associated with any dimension of the second data model.

17. A system according to claim 13, further to:

receive a first pre-query to request generation of the first calculated dimension based on the second dimension and application of the reverse of the exclude filter to the rows of the first calculated dimension; and receive a second pre-query to request generation of the second calculated dimension based on the second dimension and application of the exclude filter to the rows of the second calculated dimension.

18. A system according to claim 17, further to:

store the filtered rows of the first calculated dimension as a first intermediate table; and store the filtered rows of the second calculated dimension as a second intermediate table.

* * * * *